(12) United States Patent
Charpentier et al.

(10) Patent No.: US 10,880,767 B2
(45) Date of Patent: Dec. 29, 2020

(54) ROBUST PROTOCOL DETECTION FOR NEAR FIELD COMMUNICATION DEVICES OPERATING IN CARD-EMULATION MODE

(71) Applicant: NXP B.V., Eindhoven (NL)

(72) Inventors: Steve Charpentier, Antibes (FR); Ulrich Andreas Muehlmann, Graz (AT); Stefan Mendel, Graz (AT)

(73) Assignee: NXP B.V., Eindhoven (NL)

(*) Notice: Subject to any disclaimer, the term of this patent is extended or adjusted under 35 U.S.C. 154(b) by 0 days.

(21) Appl. No.: 16/690,210

(22) Filed: Nov. 21, 2019

(65) Prior Publication Data

US 2020/0187032 A1 Jun. 11, 2020

(30) Foreign Application Priority Data

Dec. 10, 2018 (EP) .................................... 18306656

(51) Int. Cl.
*H04W 24/08* (2009.01)
*H04L 29/06* (2006.01)
*H04B 5/00* (2006.01)

(52) U.S. Cl.
CPC .......... *H04W 24/08* (2013.01); *H04B 5/0031* (2013.01); *H04L 69/03* (2013.01)

(58) Field of Classification Search
CPC ....... H04W 24/08; H04L 69/03; H04B 5/0031
USPC ...................................................... 455/41.1
See application file for complete search history.

(56) References Cited

U.S. PATENT DOCUMENTS

| 8,250,451 B2* | 8/2012 | Nakamura ......... G06K 7/10297 |
| | | 714/764 |
| 2014/0080412 A1* | 3/2014 | Kang .................... H04L 25/066 |
| | | 455/41.1 |
| 2015/0256966 A1 | 9/2015 | Mori |

FOREIGN PATENT DOCUMENTS

| EP | 2061172 A2 | 5/2009 |
| EP | 2988461 A1 | 2/2016 |
| EP | 3039942 B1 | 7/2016 |
| EP | 3107208 A1 | 12/2016 |

* cited by examiner

*Primary Examiner* — Lee Nguyen

(57) ABSTRACT

A contactless communication device includes a near field communication (NFC) module for generating an electromagnetic carrier signal and modulating the carrier signal according to data to be transmitted, and an antenna circuit coupled to and driven by said NFC module with the modulated carrier signal. The device includes an RF front end coupled between said NFC module and said antenna circuit and further includes a protocol detection circuit for detecting a protocol mode in response to an incoming signal received by the device. The protocol detection circuit includes a plurality of filters being adapted to generate an envelope of the incoming signal; a plurality of decoders being adapted to generate an output in response to a respective envelope generated by a corresponding one of the plurality of filters; and a decision unit being adapted to detect a protocol mode based on the output from each of the plurality of decoders.

14 Claims, 4 Drawing Sheets

ROBUST PROTOCOL DETECTION FOR NEAR FIELD COMMUNICATION DEVICES OPERATING IN CARD-EMULATION MODE

CROSS-REFERENCE TO RELATED APPLICATIONS

This application claims priority under 35 U.S.C. § 119 to European Patent Application No. 18306656.2, filed on Dec. 10, 2018, the contents of which are incorporated by reference herein.

The present disclosure generally relates to contactless communication, in particular to near field communication (NFC) devices operating in card-emulation mode.

Near field communication (NFC) is a form of contactless communication between devices like smartphones or tablets. NFC devices can operate in three different modes based on the ISO/IEC 18092, NFC IP-1 and ISO/IEC 14443 contactless smart card standards. In the read/write mode, an NFC device can read or write data to any of the supported tag types in a standard NFC data format. In the Peer-to-Peer (P2P) mode, two NFC devices can exchange data such as virtual business cards or digital photos. You can also share Bluetooth or Wi-Fi link set up parameters to initiate a Bluetooth or Wi-Fi link in the P2P mode. P2P mode is standardized in the ISO/IEC 18092 standard. In the card emulation mode, NFC devices can act as a virtual version of any plastic card that conforms to the core international standard for contactless smart cards, ISO/IEC 14443 A/B (also known as ISO 14443 Type A and Type B). NFC devices can also provide support for Sony's FeliCa contactless card technology, which is widely used in Japan for both contactless card payments and for mobile payments.

In the card emulation mode, an NFC device must be able to detect, identify and decode different protocol transmissions from an external device, e.g., a reader. Example protocols may include ISO 14443 Type A (e.g., with a data rate of 106 kBits/s), ISO 14443 Type B (e.g., with a data rate of 106 kBits/s), FeliCa with a data rate of 212 kBits/s, and FeliCa with a data rate of 424 kBits/s. The ability to detect and decode a protocol mode is an important characteristic of an NFC device operating in card-emulation mode.

FIG. 1 depicts an example inductively coupled communication system. Communication system 100 may include a first communication device 102 and a second communication device 104. Communication device 102 and communication device 104 communicate with each other using inductively coupled communication. For example, the inductively coupled communication may be NFC. Examples of communication devices include wireless communication devices, cellular phones, smartphones, tablet devices, voice recorders, digital cameras, still cameras, camcorders, gaming systems, laptop computers, etc.

In inductively coupled communication, the first device 102 may generate an electromagnetic field to which the second device 104 may be coupled. For example, in the case of NFC, the direction for the data flow may be characterized by having the first device 102 (also referred to as a polling device, proximity coupling device (PCD), reader or initiator) provide the electromagnetic field. The second device 104 (also referred to as a listener, listening device, proximity integrated circuit card (PICC), tag or target) may communicate with the first device 102 by generating modulation content.

As depicted in FIG. 1, the first device 102 may include a transmitter 103 and a receiver 104. The transmitter and receiver may be part of an NFC module 106, such as type no. PN5xx manufactured by NXP Semiconductors. The first device 102 may further include an RF front end module 105 and an antenna 107. The second device 104 may include an antenna 108, which is inductively coupled to the antenna 107.

FIG. 2 is an example NFC device. As shown in FIG. 2, NFC device 200 includes an NFC module 2', such as type no. PN5xx manufactured by NXP Semiconductors. NFC module 2' may include a transmitter 3 being adapted to generate an electromagnetic carrier signal, to modulate the carrier signal according to data to be transmitted and to drive an antenna circuit 5 with the modulated carrier signal. NFC module 2' may further include a receiver 4 being adapted to sense response signals being received at antenna circuit 5 and to demodulate the response signals. NFC module 2' has output terminals TX1 and TX2 coupled to respective first and second transmitting paths wherein the first and second transmitting paths are coupled to antenna circuit 5. Between the output terminals TX1 and TX2 and antenna circuit 5, the following devices may be switched into the transmitting paths: an electromagnetic compatibility (EMC) filter 6' comprising two inductors $L_{EMC}$ and two capacitors $C_{EMC}$, a balanced to unbalanced (Balun) transformer 7' for converting differential antenna matching network to single-end antenna matching network, and an impedance matching network (not shown).

SUMMARY

A device for contactless communication includes an NFC module being adapted to generate an electromagnetic carrier signal and to modulate the carrier signal according to data to be transmitted; an antenna circuit coupled to and driven by said NFC module with the modulated carrier signal; and an RF front end coupled between said NFC module and said antenna circuit. Said device further includes a protocol detection circuit for detecting a protocol mode in response to an incoming signal. Said protocol detection circuit includes a plurality of filters arranged in parallel, each filter being adapted to generate an envelope of the incoming signal; a plurality of decoders arranged in parallel, each of the plurality of decoders being coupled to a corresponding one of the plurality of filters, each decoder being adapted to generate an output in response to a respective envelope generated by the corresponding one of the plurality of filters; and a decision unit coupled to the plurality of decoders, said decision unit being adapted to detect a protocol mode based on the output from each of the plurality of decoders.

In one embodiment, the protocol mode is one of ISO 14443 Type A with a data rate of 106 kBits/s, ISO 14443 Type B with a data rate of 106 kBits/s, FeliCa with a data rate of 212 kBits/s, and FeliCa with a data rate of 424 kBits/s.

In one embodiment, the plurality of filters includes an ISO 14443 Type A filter, an ISO 14443 Type B filter, a FeliCa filter with a data rate of 212 kBits/s, and a FeliCa filter with a data rate of 424 kBits/s.

In one embodiment, the plurality of decoders includes an ISO 14443 Type A decoder, an ISO 14443 Type B decoder, a FeliCa decoder with a data rate of 212 kBits/s, and a FeliCa decoder with a data rate of 424 kBits/s.

In one embodiment, the ISO 14443 Type A decoder is adapted to detect an X number of successive valid ISO 14443 Type A data and output the X number of successive valid ISO 14443 Type A data, wherein X is programmable.

In one embodiment, the ISO 14443 Type B decoder is adapted to detect a valid ISO 14443 Type B Start of Frame (SoF) and output the SoF to the decision unit.

In one embodiment, each of the FeliCa decoders (212 kBits/s and 424 kBits/s) is adapted to detect a valid SYNC pattern and output the respective valid SYNC pattern to the decision unit.

In one embodiment, each of the plurality of decoders is adapted to detect an error in response to a respective envelope generated by the corresponding one of the plurality of filters, wherein said respective decoder and the corresponding filter are disabled in response to the detected error.

In one embodiment, said decision unit being adapted to detect a protocol mode based on the output from each of the plurality of decoders includes detecting a valid Type B SoF and switching to ISO 14443 Type B protocol settings for said NFC device in response to said protocol mode detection.

In one embodiment, said decision unit being adapted to detect a protocol mode based on the output from each of the plurality of decoders includes detecting a valid Type A data frame and switching to ISO 14443 Type A protocol settings for said NFC device in response to said protocol mode detection.

In one embodiment, said decision unit being adapted to detect a protocol mode based on the output from each of the plurality of decoders includes detecting a valid FeliCa SYNC pattern and switching to FeliCa protocol settings for said NFC device in response to said protocol mode detection.

In one embodiment, said device is incorporated in a mobile device.

In one embodiment, said device is adapted to operate in card emulation mode.

A method for detecting a protocol mode for a near field communication (NFC) device operating in card emulation mode includes receiving an incoming signal from an external device; filtering the incoming signal by a plurality of filters arranged in parallel, said filtering by the plurality of filters including generating an envelope of the incoming signal by each of the plurality of filters; decoding the envelope generated by each of the plurality of filters by a corresponding one of a plurality of decoders arranged in parallel, said decoding the envelope by a corresponding one of the plurality of decoders includes generating an output for each of the plurality of the decoders; and determining a protocol mode for said NFC device based on the output generated for each of the plurality of decoders.

In one embodiment, determining a protocol mode for the NFC device based on the output generated for each of the plurality of decoders includes one of: detecting a valid Type B SoF and switching to ISO 14443 Type B protocol settings for said NFC device in response to said detection; detecting a valid Type A data frame and switching to ISO 14443 Type A protocol settings for said NFC device in response to said detection; and detecting a valid FeliCa SYNC pattern and switching to FeliCa protocol settings for said NFC device in response to said detection.

The above discussion is not intended to represent every example embodiment or every implementation within the scope of the current or future Claim sets.

Various example embodiments may be more completely understood in consideration of the following Detailed Description in connection with the accompanying Drawings.

Figure 1:
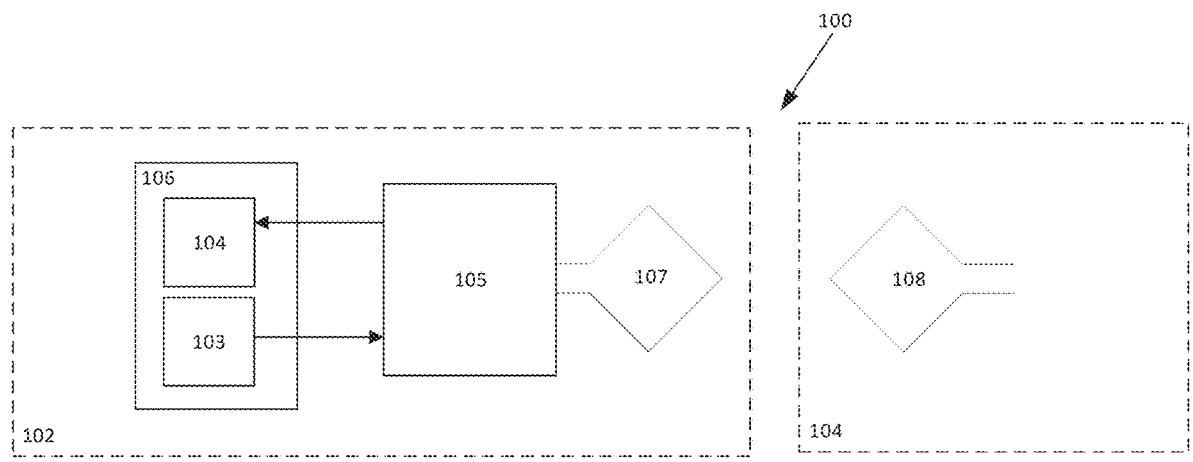
FIG. 1 is an example inductively coupled communication system.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Figure 2:
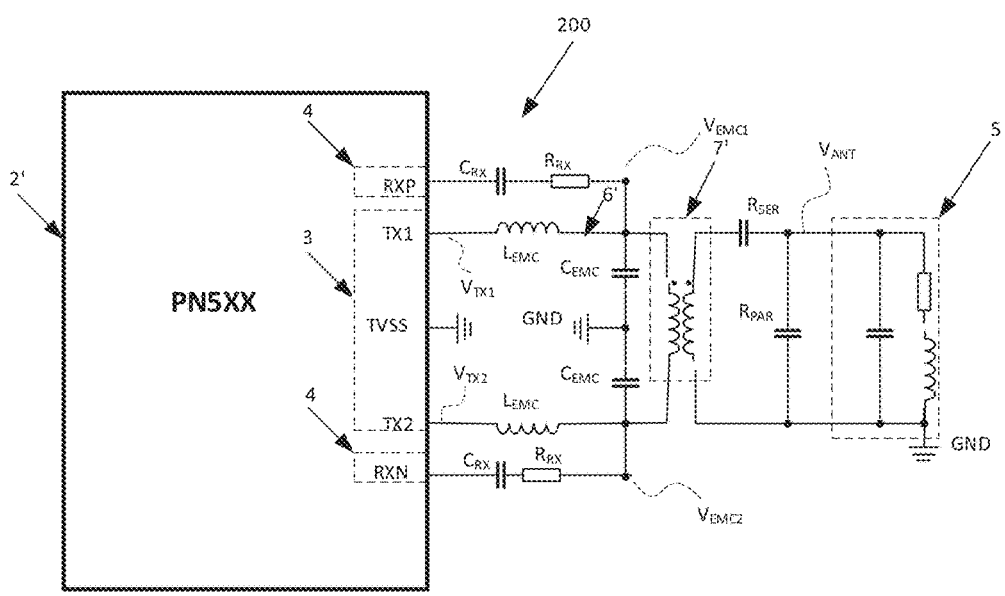
FIG. 2 is an example NFC device.
Figure 3:
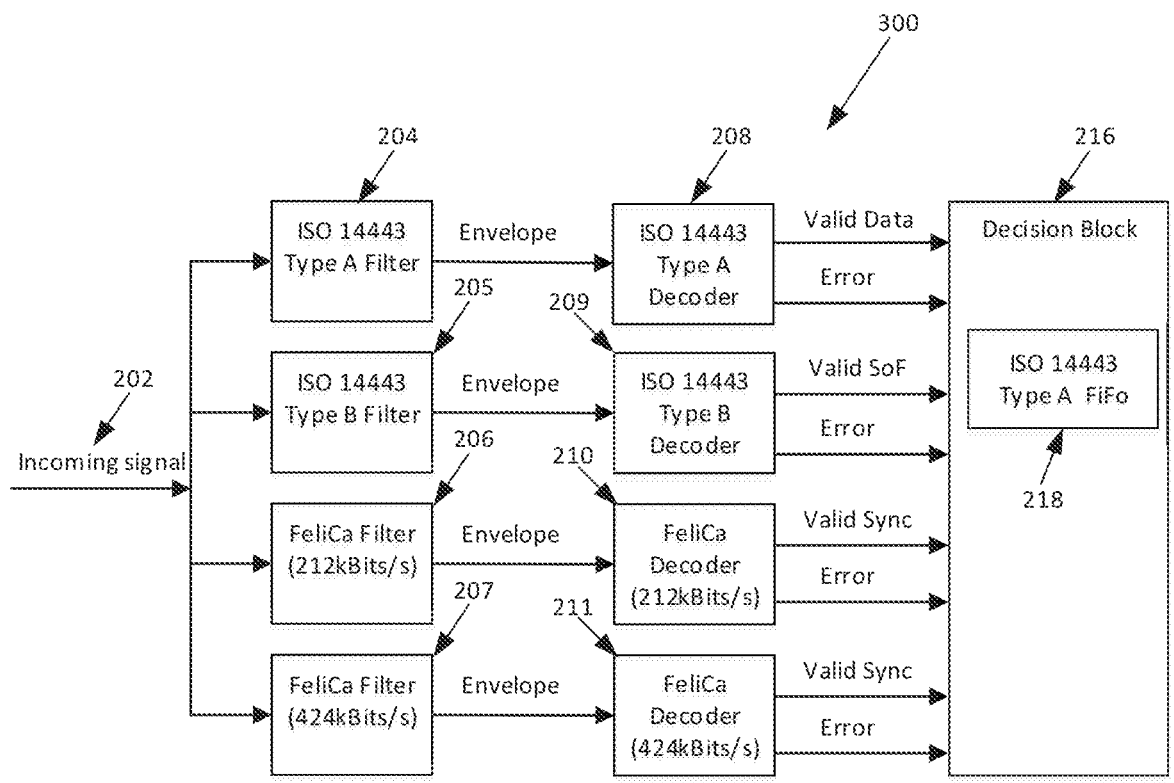
FIG. 3 illustrates a circuit diagram for detecting and decoding different protocol transmissions for an NFC device.

FIG. 3 illustrates a circuit 300 for detecting and decoding a protocol mode for a NFC device operating in card emulation mode. In one embodiment, circuit 300 of FIG. 3 is implemented in the NFC device of FIG. 2.

As shown in FIG. 3, incoming signal 202 is received at circuit 300 by a first filter 204, a second filter 205, a third filter 206, and a fourth filter 207, respectively. In one embodiment, incoming signal 202 is a digital signal, e.g., a digital output signal from an analog-to-digital converter (ADC, A/D, or A-to-D). In one embodiment, first filter 204 is configured to detect and filter ISO 14443 Type A signal with a data rate of 106 kBits/s (hereinafter referred to as ISO 14443 Type A filter), second filter 205 is configured to detect and filter ISO 14443 Type B signal with a data rate of 106 kBits/s (hereinafter referred to as ISO 14443 Type B filter), third filter 206 is configured to detect and filter FeliCa signal with a data rate of 212 kBits/s (hereinafter referred to as FeliCa 212 filter), and fourth filter 207 is configured to detect and filter FeliCa signal with a data rate of 424 kBits/s (hereinafter referred to as FeliCa 424 filter). For example, assuming the incoming signal is an ISO 14443 Type A signal, the first filter 204, which is configured as an ISO 14443 Type A filter, provides an envelope output that matches the incoming ISO 14443 Type A signal; whereas each of the other filters 205, 206, and 207 outputs a random envelope, which gives rise to an error at the output of a corresponding decoder when the envelope is decoded (as described below).

As depicted in FIG. 3, the output envelope from each of the four filters 204, 205, 206, and 207 is decoded by a corresponding decoder 208, 209, 210, and 211. In one embodiment, the envelope output of filter 204 is decoded by decoder 208, the envelope output of filter 205 is decoded by decoder 209, the envelope output of filter 206 is decoded by decoder 210, and the envelope output of filter 207 is decoded by decoder 211. In one embodiment, the decoders 208, 209, 210, and 211 are running simultaneously and in parallel.

In one embodiment, decoder 208 is configured to detect and decode the envelope of an ISO 14443 Type A signal with a data rate of 106 kBits/s (hereinafter referred to as ISO 14443 Type A decoder), decoder 209 is configured to detect and decode the envelope of an ISO 14443 Type B signal with a data rate of 106 kBits/s (hereinafter referred to as ISO 14443 Type B decoder), decoder 210 is configured to detect and decoder the envelope of a FeliCa signal with a data rate of 212 kBits/s (hereinafter referred to as FeliCa 212 decoder), and decoder 211 is configured to detect and decode the envelope of a FeliCa signal with a data rate of 424 kBits/s (hereinafter referred to as FeliCa 424 decoder).

For example, the ISO 14443 Type A decoder 208 correctly decodes the envelope of an ISO 14443 Type A signal and outputs a valid ISO 14443 Type A data (a valid ISO 14443 Type A data frame has x number of valid ISO 14443 Type A data or data bits, where x is an arbitrary number).

In another example, the ISO 14443 Type B decoder 209 correctly decodes the envelope of an ISO 14443 Type B signal and outputs a valid Start of Frame (SOF) for an ISO 14443 Type B data frame.

In yet another example, the FeliCa decoder 210 correctly decodes the envelope of a FeliCa signal with a data rate of 212 kBits/s and outputs a valid SYNC pattern for a FeliCa data frame with a data rate of 212 kBits/s. Similarly, the FeliCa decoder 211 correctly decodes the envelope of a FeliCa signal with a data rate of 424 kBits/s and outputs a valid SYNC pattern for a FeliCa data frame with a data rate of 424 kBits/s.

In one embodiment, each of the decoders 208, 209, 210, and 211 can detect an error with respect to the reception of a protocol transmission and generate an error at its output. For example, an ISO 14443 Type A signal (e.g., an ISO 14443 Type A data frame) will raise an error on the ISO 14443 Type B decoder 209 and Felica decoders (201, 211), an ISO 14443 Type B signal (e.g., an ISO 14443 Type B data frame) will raise an error on the ISO 14443 Type A decoder 208 and Felica decoders (201, 211), and a FeliCa signal (e.g., a FeliCa data frame) will raise an error on the ISO 14443 Type A decoder 208 and ISO 1443 Type B decoder 209. The errors may include incorrect SoF timings detected for an ISO 14443 Type B data, incorrect Manchester coding detected for a FeliCa data, incorrect Miller coding detected for an ISO 14443 Type A data, etc. In one embodiment, when an error is detected by a decoder, the decoder and the corresponding filter are both disabled and will be enabled only if all the other decoders are disabled.

As depicted in FIG. 3, circuit 300 may further include a decision unit 216. Decision unit 216 is configured to detect and determine a protocol mode (i.e., protocol transmission from incoming signals) in response to the outputs from each of the decoders. As explained earlier, an NFC device operating in card emulation mode must be able to detect, identify and decode different protocol transmissions from an external device, e.g., a reader. Example protocols may include ISO 14443 Type A with a data rate of 106 kBits/s, ISO 14443 Type B with a data rate of 106 kBits/s, FeliCa with a data rate of 212 kBits/s, and FeliCa with a data rate of 424 kBits/s. The ability to detect and decode a protocol mode is an important characteristic of an NFC device operating in card-emulation mode.

In one embodiment, an algorithm is implemented for the decision unit. The algorithm determines that a protocol mode is detected in response to the outputs received from the decoders and switches the system (e.g., the NFC device) to the protocol settings of the detected protocol if one of the following mutually exclusive conditions is satisfied:

If an X number of successive valid ISO 14443 Type A data is detected, then select and switch the system to the ISO 14443 Type A protocol setting and disable all other filters and decoders except for the Type A filter and decoder. The number X is programmable. In one embodiment, X equals seven (the requirement for seven successive valid Type A data is because the ISO 14443 Type A decoder detects an error at its output after five valid ISO 14443 Type A data).

If a valid Start of Frame (SoF) for ISO 14443 Type B is detected, then select and switch the system to the ISO 14443 Type B protocol setting and disable all other filters and decoders except for the Type B filter and decoder.

If a valid FeliCa SYNC pattern (212 kBits/s or 424 kBits/s) is detected, then select and switch the system to the corresponding Felica protocol setting and disable all other filters and decoders except for the FeliCa filter and decoder.

With respect to the first condition, since the decision unit will switch the system to the ISO 14443 Type A protocol settings only after detecting an X number of successive valid ISO 14443 Type A data, a First-In First-Out (FIFO) 218 may be implemented in the decision unit to temporarily store the X number of successive valid ISO 14443 Type A data output from the ISO 14443 Type A decoder in the meantime.

Thus, the decision unit as described above is able to detect and determine a protocol mode only based on the decoder signals, e.g., a valid Type A frame detected, a valid Type B SoF detected, a valid FeliCa SYNC pattern detected. As such, the input signal characteristics are not relevant for the protocol detection, allowing a robust and early protocol detection with minimal area involved. Furthermore, the implementation as illustrated in FIG. 3 allows the NFC device to be insensitive to modulation depth or any physical characteristic of an incoming signal, and therefore the NFC device can work with readers that are not ISO compliant.

Figure 4A:
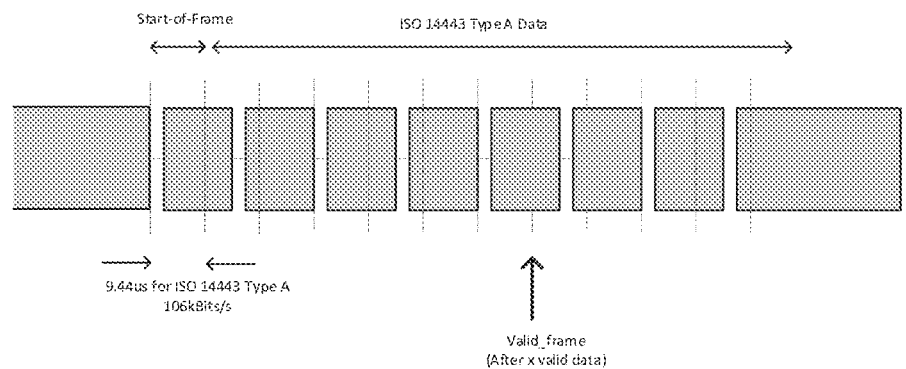
FIG. 4A illustrates an example valid Type A data output by the ISO 14443 Type A decoder of FIG. 3.
Figure 4B:
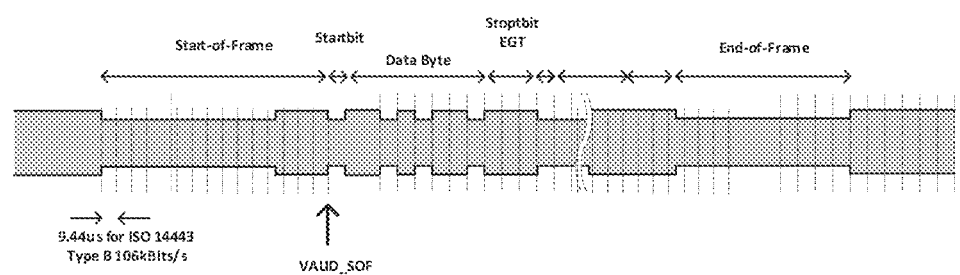
FIG. 4B illustrates an example valid Type B SoF output by the ISO 14443 Type B decoder of FIG. 3.
Figure 4C:
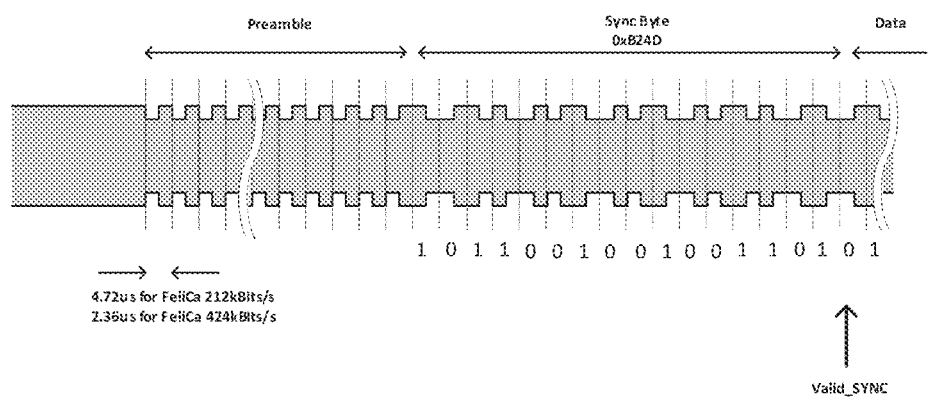
FIG. 4C illustrates an example valid FeliCa SYNC pattern output by the respective Felica decoders (212 k Bits/s and 424 kBits/s).

FIG. 4A illustrates an example valid Type A data output by the ISO 14443 Type A decoder of FIG. 3. FIG. 4B illustrates an example valid Type B SoF output by the ISO 14443 Type B decoder of FIG. 3. FIG. 4C illustrates an example valid FeliCa SYNC pattern output by the respective Felica decoders (212 k Bits/s and 424 kBits/s). These examples shown are well known to those skilled in the art, and thus would not be explained in further detail.

Figure 5:
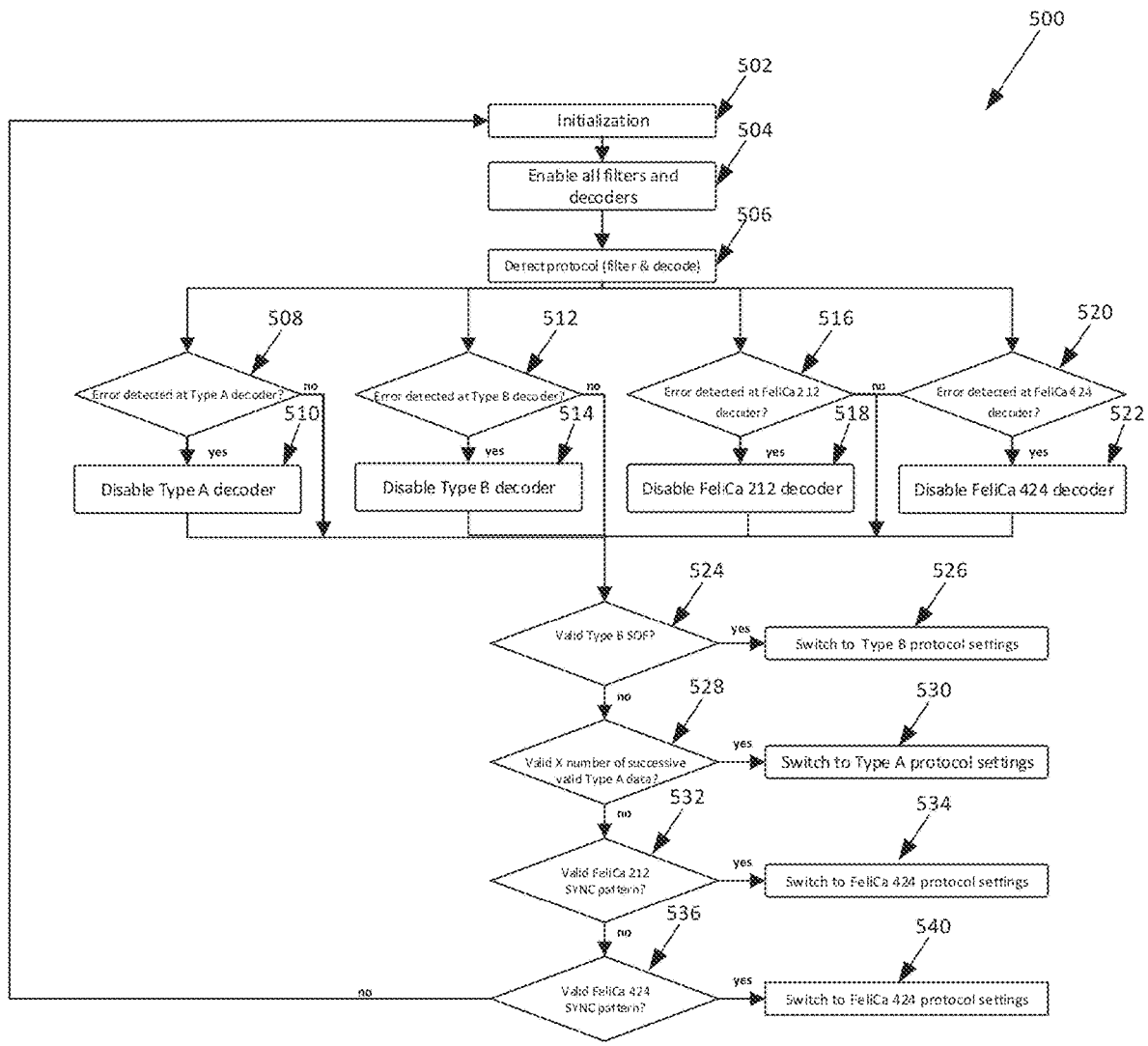
FIG. 5 is a flow diagram for implementing a method for detecting and decoding different protocol transmissions for an NFC device.

FIG. 5 is a flow diagram for implementing a method 500 for detecting and decoding a protocol mode for an NFC device operating in card emulation mode.

Referring to FIG. 5, method 500 starts at step 502, in which initialization takes place for the detection of different protocol transmissions for the NFC device. At step 506, all the filters and decoders are enabled. For example, as depicted in FIG. 3, filters 204, 205, 206, 207 and decoders 208, 209, 210 and 211 are enabled. At step 508, method 500 begins protocol detection by filtering and decoding of incoming signals as explained above with reference to FIG. 3. At steps 508, 512, 516, and 520, the method detects if an error is detected at the output of each decoder. If an error is detected at the output of any of the decoders, then the decoder and the corresponding filter are disabled according to steps 510, 514, 518, and 522 respectively. Otherwise, then method 500 proceeds to step 524.

At step 524, method 500 detects if a valid Type B SoF is detected at the output of the ISO 14443 Type B decoder. If a valid Type B SoF is detected, method 500 switches the NFC device to the ISO 14443 Type B protocol settings at step 526. Otherwise, method 500 proceeds to step 528.

At step 528, method 500 detects if an X number of successive valid Type A data is detected at the output of the ISO 14443 Type A decoder. If an X number of successive valid Type A data is detected, method 500 switches the NFC device to the ISO 14443 Type A protocol settings at step 530. The number X is programmable. In one embodiment, X equals seven (a valid Type A frame includes seven successive valid Type A data). Otherwise, method 500 proceeds to step 532.

At step 532, method 500 detects if a valid FeliCa SYNC pattern is detected at the output of the FeliCa decoder (212 kBits/s). If a valid FeliCa SYNC pattern is detected, method 500 switches the NFC device to the FeliCa (212 kBits/s) protocol settings at step 534. Otherwise, method 500 proceeds to step 536.

At step 536, method 500 detects if a valid FeliCa SYNC pattern is detected at the output of the FeliCa decoder (424 kBits/s). If a valid FeliCa SYNC pattern is detected, method 500 switches the NFC device to the FeliCa (424 kBits/s) protocol settings at step 540. Otherwise, method 500 returns to step 502.

As provided herein, the method described above allows a robust and early protocol detection regardless of the input signal characteristics. The method detects and determines a protocol mode only based on the decoder signals, e.g., a valid Type A frame detected, a valid Type B SoF detected, a valid FeliCa SYNC pattern detected. As a result, the receiver of an NFC device is insensitive to the modulation depth or any physical characteristic of the incoming signals, thereby allowing the NFC device to work with readers that are not ISO compliant.

It should be noted that the above-mentioned embodiments illustrate rather than limit the invention, and that those skilled in the art will be able to design many alternative embodiments without departing from the scope of the appended claims. It is intended that the following claims cover all possible example embodiments.

In the claims, any reference signs placed between parentheses shall not be construed as limiting the claim. The word "comprising" does not exclude the presence of elements or steps other than those listed in a claim. The indefinite article "a" or "an" preceding an element does not exclude the presence of a plurality of such elements. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A device for contactless communication comprising:
a near field communication (NFC) module being adapted to generate an electromagnetic carrier signal and to modulate the carrier signal according to data to be transmitted, said NFC module including a transmitter and a receiver;
an antenna circuit coupled to said NFC module and driven by said NFC module with the modulated carrier signal;
an RF front end coupled between said NFC module and said antenna circuit; and
a protocol detection circuit for detecting a protocol mode in response to an incoming signal, said protocol detection circuit including:
a plurality of filters arranged in parallel, each filter being adapted to generate an envelope of the incoming signal, wherein the plurality of filters includes a first filter to detect and filter an ISO 14443 Type A signal, a second filter to detect and filter an ISO 14443 Type B signal, and a third filter to detect and filter a FeliCa signal with a data rate of either 212 kBits/s or 424 kBits/s;
a plurality of decoders arranged in parallel, each of the plurality of decoders being coupled to a corresponding one of the plurality of filters, each decoder being adapted to generate an output in response to a respective envelope generated by the corresponding one of the plurality of filters; and
a decision unit coupled to the plurality of decoders, said decision unit being adapted to detect a protocol mode based on the output from each of the plurality of decoders.

2. The device of claim 1, wherein the plurality of decoders includes an ISO 14443 Type A decoder, an ISO 14443 Type B decoder, a FeliCa decoder with a data rate of 212 kBits/s, and a FeliCa decoder with a data rate of 424 kBits/s.

3. The device of claim 2, wherein the ISO 14443 Type A decoder is adapted to detect an X number of successive valid ISO 14443 Type A data and output the X number of successive valid ISO 14443 Type A data, wherein X is programmable.

4. The device of claim 3, wherein the decision unit further comprises a first-in, first-out (FIFO) buffer to temporarily store the X number of successive valid ISO 14443 Type A data from the ISO 14443 Type A decoder.

5. The device of claim 2, wherein the ISO 14443 Type B decoder is adapted to detect a valid ISO 14443 Type B Start of Frame (SoF) and output the SoF to the decision unit.

6. The device of claim 2, wherein each of the FeliCa decoders (212 kBits/s and 424 kBits/s) is adapted to detect a valid SYNC pattern and output the respective valid SYNC pattern to the decision unit.

7. The device of claim 1, wherein each of the plurality of decoders is adapted to detect an error in response to a respective envelope generated by the corresponding one of the plurality of filters, wherein said respective decoder and the corresponding filter are disabled in response to the detected error.

8. The device of claim 1, wherein said decision unit being adapted to detect a protocol mode based on the output from each of the plurality of decoders includes detecting a valid Type B SoF and switching to ISO 14443 Type B protocol settings for said NFC device in response to said protocol mode detection.

9. The device of claim 1, wherein said decision unit being adapted to detect a protocol mode based on the output from each of the plurality of decoders includes detecting a valid Type A data frame and switching to ISO 14443 Type A protocol settings for said NFC device in response to said protocol mode detection.

10. The device of claim 1, wherein said decision unit being adapted to detect a protocol mode based on the output from each of the plurality of decoders includes detecting a valid FeliCa SYNC pattern and switching to FeliCa protocol settings for said NFC device in response to said protocol mode detection.

11. The device of claim 1, wherein said device is incorporated in a mobile device.

12. The device of claim 1, wherein said device is adapted to operate in card emulation mode.

13. A method for detecting a protocol mode for a near field communication (NEC) device operating in card emulation mode comprising:
receiving an incoming signal from an external device;
filtering the incoming signal by a plurality of filters arranged in parallel, said filtering by the plurality of filters including generating an envelope of the incoming signal by each of the plurality of filters, wherein the plurality of filters includes a first filter for detecting and filtering an ISO 14443 Type A signal, a second filter for detecting and filtering an ISO 14443 Type B signal, and a third filter for detecting and filtering a FeliCa signal with a data rate of either 212 kBits/s or 424 kBits/s;

decoding the envelope generated by each of the plurality of filters by a corresponding one of a plurality of decoders arranged in parallel, said decoding the envelope by a corresponding one of the plurality of decoders includes generating an output for each of the plurality of the decoders; and determining a protocol mode for said NFC device based on the output generated for each of the plurality of decoders.

14. The method of claim 13, wherein determining a protocol mode for the NFC device based on the output generated for each of the plurality of decoders includes one of:

detecting a valid Type B SoF and switching to ISO 14443 Type B protocol settings for said NFC device in response to said detection;

detecting a valid Type A data frame and switching to ISO 14443 Type A protocol settings for said NFC device in response to said detection; and detecting a valid FeliCa SYNC pattern and switching to FeliCa protocol settings for said NFC device in response to said detection.

* * * * *